US011814795B2

(12) United States Patent
Mattingly et al.

(10) Patent No.: US 11,814,795 B2
(45) Date of Patent: Nov. 14, 2023

(54) COATING FOR RECYCLABLE PAPER

(71) Applicant: JL Darling LLC, Tacoma, WA (US)

(72) Inventors: John T. Mattingly, Fox Island, WA (US); Paul Snowwhite, Dexter, MI (US)

(73) Assignee: JL Darling LLC, Tacoma, WA (US)

(*) Notice: Subject to any disclaimer, the term of this patent is extended or adjusted under 35 U.S.C. 154(b) by 217 days.

(21) Appl. No.: 15/942,906

(22) Filed: Apr. 2, 2018

(65) Prior Publication Data

US 2018/0282947 A1    Oct. 4, 2018

Related U.S. Application Data

(60) Provisional application No. 62/481,009, filed on Apr. 3, 2017.

(51) Int. Cl.
*D21H 21/16*    (2006.01)
*D21H 19/22*    (2006.01)
(Continued)

(52) U.S. Cl.
CPC ............ *D21H 21/16* (2013.01); *D21H 11/14* (2013.01); *D21H 17/35* (2013.01); *D21H 17/37* (2013.01);
(Continued)

(58) Field of Classification Search
CPC ........ D21H 21/16; D21H 11/14; D21H 17/35; D21H 17/37; D21H 19/20; D21H 19/22; D21H 19/56; D21H 19/84
(Continued)

(56) References Cited

U.S. PATENT DOCUMENTS 3,642,943 A * 2/1972 Noel ...................... C08G 18/10
427/393.5
3,983,268 A    9/1976 Scharf et al.
(Continued)

FOREIGN PATENT DOCUMENTS

EP    0 398 577 A1    11/1990
EP    2 330 170 A1    6/2011
(Continued)

OTHER PUBLICATIONS

Advanced Chemistry Labs, "Specific Classes of Compounds", Feb. 2, 1998, p. 2 (Year: 1998).*
(Continued)

*Primary Examiner* — Callie E Shosho
*Assistant Examiner* — Steven A Rice
(74) *Attorney, Agent, or Firm* — Seed IP Law Group LLP

(57) ABSTRACT

The present disclosure relates to weatherproof or moisture-resistant writable or printable paper or paper-containing substrates, which includes recyclable cellulosic sheets coated with a coating layer. Sheets are suitable for writing and printing and are prepared by impregnantly coating a cellulosic substrate. In addition, a composition used for coating paper sheets and related substrates to obtain general-purpose weatherproof sheets comprising a substrate, a polymer, a cross-linking agent and methods for producing and using the same are disclosed. The sheets resist degradation, remain legible, can be written upon when wet, and are recyclable.

15 Claims, 4 Drawing Sheets

(51) Int. Cl.
*D21H 19/84* (2006.01)
*D21H 19/20* (2006.01)
*D21H 11/14* (2006.01)
*D21H 17/37* (2006.01)
*D21H 17/35* (2006.01)
*D21H 19/56* (2006.01)

(52) U.S. Cl.
CPC ............ *D21H 19/20* (2013.01); *D21H 19/22* (2013.01); *D21H 19/56* (2013.01); *D21H 19/84* (2013.01)

(58) Field of Classification Search
USPC ........................................................ 428/507
See application file for complete search history.

(56) References Cited

U.S. PATENT DOCUMENTS

| | | | |
|---|---|---|---|
| 4,336,297 A | 6/1982 | Fushiki et al. | |
| 4,931,359 A | 6/1990 | Yagi et al. | |
| 5,139,614 A | 8/1992 | dePierne et al. | |
| 5,276,002 A | 1/1994 | Okumura et al. | |
| 5,401,562 A | 3/1995 | Akao | |
| 5,413,867 A | 5/1995 | Chang et al. | |
| 5,660,919 A | 8/1997 | Vallee et al. | |
| 5,762,799 A | 6/1998 | Dadea | |
| 5,891,552 A | 4/1999 | Lu et al. | |
| 5,919,552 A | 7/1999 | Malhotra | |
| 5,981,011 A | 11/1999 | Overcash et al. | |
| 6,028,028 A | 2/2000 | Nitta | |
| 6,087,457 A | 7/2000 | Tsai | |
| 6,140,412 A | 10/2000 | Saitoh et al. | |
| 6,187,135 B1* | 2/2001 | Chung | D21C 5/02 162/4 |
| 6,294,265 B1* | 9/2001 | Loelovich | D21H 19/20 106/203.2 |
| 6,391,954 B2 | 5/2002 | Azizi et al. | |
| 6,596,805 B1 | 7/2003 | Nigam et al. | |
| 6,677,006 B2 | 1/2004 | Otani et al. | |
| 2002/0010267 A1* | 1/2002 | Klaerner | G01N 33/54353 525/91 |
| 2003/0113565 A1* | 6/2003 | Silver | G03G 7/0046 428/486 |
| 2005/0019569 A1* | 1/2005 | Stoyanov | D21C 9/005 428/375 |
| 2006/0106161 A1 | 5/2006 | Sawant et al. | |
| 2008/0233385 A1* | 9/2008 | Ullmann | D21H 21/16 428/320.2 |
| 2010/0062668 A1* | 3/2010 | Goldstein | C08K 5/3412 442/172 |
| 2010/0152394 A1 | 6/2010 | Slark et al. | |
| 2011/0236605 A1* | 9/2011 | Hattori | C08G 18/10 428/1.55 |
| 2011/0236611 A1* | 9/2011 | Servante | C09D 175/16 428/34.1 |
| 2013/0012108 A1* | 1/2013 | Li | B24D 3/28 451/59 |

FOREIGN PATENT DOCUMENTS

| | | |
|---|---|---|
| FR | 2 365 002 A1 | 4/1978 |
| GB | 1 593 331 A | 7/1981 |
| JP | 56-148997 A | 11/1981 |
| JP | 11-61688 A | 3/1999 |
| JP | 2000-80595 A | 3/2000 |
| WO | 2015/091648 A1 | 6/2015 |
| WO | 2016/077907 A1 | 5/2016 |
| WO | 2016/183314 A1 | 11/2016 |

OTHER PUBLICATIONS

PubChem "2,2-Bis[3-(2-methylaziridin-1-yl)propanoyloxymethyl]butyl 3-(2-methylaziridin-1-yl)propanoate", Aug. 8, 2005, pp. 1-2 (Year: 2005).*

Xu, Guozhong; "Wet Strength Improvement of Paper Via Crosslinking of Cellulose Using Polymeric Carboxylic Acids and Aldehydes", 2001, pp. 22 and 41 (Year: 2001).*

* cited by examiner

COATING FOR RECYCLABLE PAPER

BACKGROUND

Technical Field

The present disclosure is directed to weatherproof or moisture-resistant writable or printable paper or paper-containing substrates, which includes recyclable sheets of cellulose fibers, such as paper, coated with a coating layer, as well as preparation and use of the same.

Background

Various methods are known for treating paper to make it liquid-repellant or liquid-proof, or to enhance its wet-strength. A number of the known methods for treating paper to render it more water-repellent use paper sizing or surface sizing. Various compositions have been described as suitable for surface sizing but are limited with respect to their ability to produce paper that is sufficiently water-repellant or water-proof so as to remain intact and legible when wet or provide a surface that, under wet conditions, can be written upon with pen or pencil.

None of the methods known in the art are directed to providing a paper for writing or printing that can remain intact, maintain a surface that can be legibly written upon with pen or pencil under extreme wet conditions, and can be recycled by conventional means. Additionally, processes known in the art fail to provide a coated paper product that can be obtained from a wide variety of available, stock papers for writing or printing (e.g., recycled paper).

Accordingly, there remains a need in the art for a cellulosic composition (e.g., paper) that is weatherproof, but can be written upon with a pen or pencil (i.e., has desirable wet strength). In particular, a need exists for such a composition that can be re-pulped and recycled and is compatible with a wide variety paper stocks (particularly recycled stock). Finally, there remains a need in the art for compositions and methods that can provide paper having the above-described properties with water-based materials (i.e., environmentally friendly chemicals) capable of imparting the requisite water resistance and wet strength. The present disclosure fulfills these needs and provides further related advantages.

BRIEF DESCRIPTION

Generally, the present disclosure relates to weatherproof or moisture-resistant writable or printable paper or paper-containing substrates. Accordingly, in one embodiment is provided a substrate comprising:

a plurality of cellulose fibers and having two substantially planar sides;
a coating layer comprising a plurality of first polymers, the coating layer being in direct contact and impregnantly covering at least a portion of one of the two sides of the substrate; and
at least one cross-link between:
(i) one of the plurality of cellulose fibers and one of the plurality of first polymers;
(ii) two of the plurality of first polymers; or
(iii) two of the plurality of cellulose fibers.

Another embodiment provides a composition comprising:
a substrate comprising a plurality of cellulose fibers having two substantially planar sides;
a polymer comprising at least one polyacrylic polymer; and a cross-linking agent having one of the following structures (I'), (II'), (III'), or (IV'):

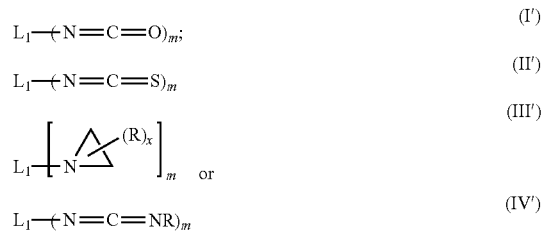

wherein:
L$_1$ is a multi-valent linker comprising an optionally substituted alkylene, haloalkylene, cycloalkylene, heteroalkylene, haloheteroalkylene, cycloheteroalkylene, arylene, haloarylene, or haloheteroarylene;
m is a positive integer;
x is 0, 1, 2, 3, or 4; and
R is at each occurrence, independently H, alkyl, cycloalkyl, alkylaminoalkyl or halo.

In one embodiment, is provided, a method for coating a substrate, the method comprising
i. providing a substrate comprising a plurality of cellulose fibers and having two substantially planar sides; and
ii. contacting the substrate with a composition comprising a plurality of first polymers and a cross-linking agent thereby forming:
a) a coating layer, the coating layer comprising the plurality of first polymers, the coating layer being in direct contact and impregnantly covering at least a portion of one of the two sides of the substrate; and
b) at least one cross-link between:
i) one of the plurality of cellulose fibers and one of the plurality of first polymers;
ii) two of the plurality of first polymers; or
iii) two of the plurality of cellulose fibers.

These and other aspects of this disclosure will be evident upon reference to the following detailed description of the disclosure.

BRIEF DESCRIPTION OF THE DRAWINGS

In the figures, identical reference numbers identify similar elements or acts. The sizes and relative positions of elements in the figures are not necessarily drawn to scale. For example, the shapes of various elements and angles are not drawn to scale and some of these elements are enlarged and positioned to improve figure legibility. Further, the particular shapes of the elements as drawn, are not intended to convey any information regarding the actual shape of the particular elements, and have been solely selected for ease of recognition in the figures.

DETAILED DESCRIPTION

Figure 1:
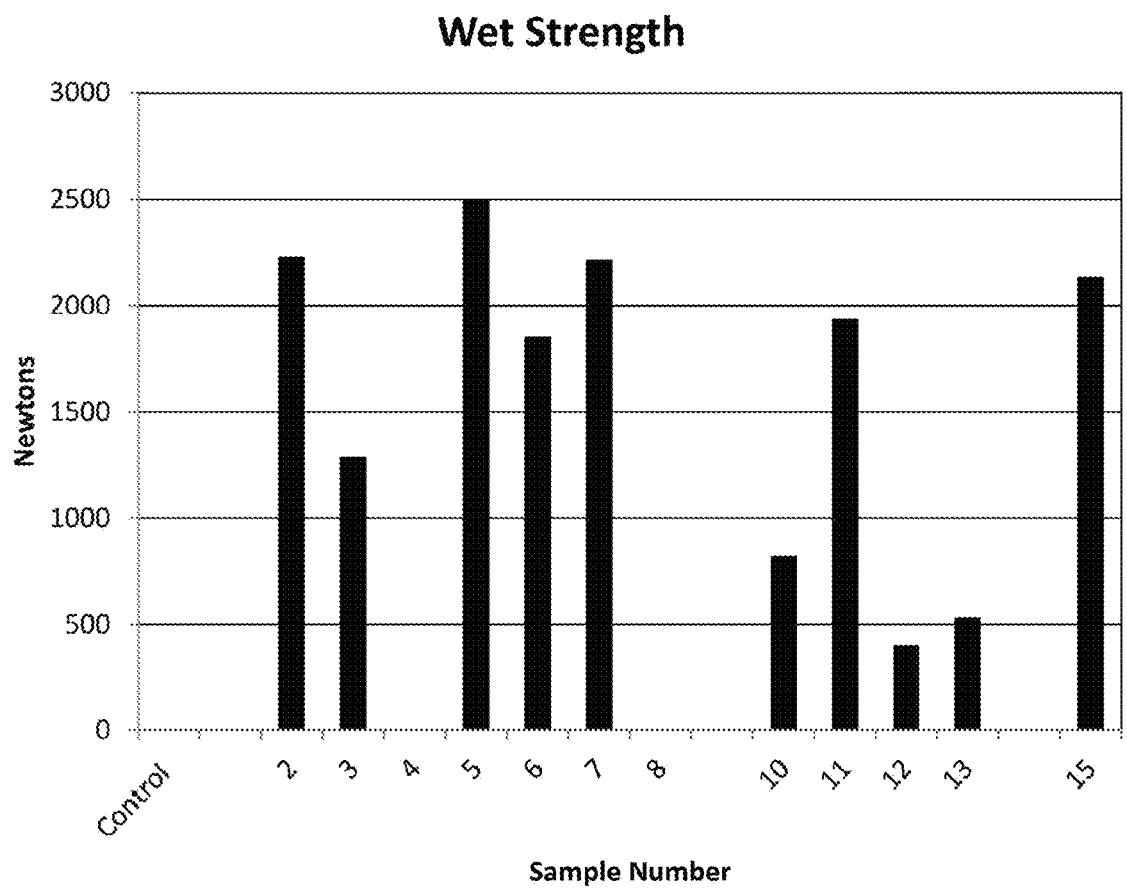
FIG. 1 shows the effect of various cross-linkers on wet strength of short fiber paper.

Weatherproof and moisture-resistant writable or printable paper or paper-containing substrates, including recyclable sheets of cellulose fibers, such as paper, coated with a coating layer, as well as preparation and use thereof, are disclosed herein below. The particulars described herein are by way of example and are only for purposes of illustrative discussion of embodiments of the present disclosure. The use of any and all examples, or exemplary language (e.g., "such as" or "for example") provided herein is merely intended to better illuminate the disclosure and does not pose a limitation on the scope of the disclosure as claimed. No language in the specification should be construed as indicating any non-claimed element is essential to the practice of the disclosure. Further, all methods described herein can be performed in any suitable order unless otherwise indicated herein or otherwise clearly contradicted by context.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

Each embodiment disclosed herein can comprise, consist essentially of, or consist of a particular stated element, step, ingredient, or component. As used herein, the term "comprise" or "comprises" means "includes, but is not limited to," and allows for the inclusion of unspecified elements, steps, ingredients, or components, even in major amounts. As used herein, the phrase "consisting of" excludes any element, step, ingredient, or component that is not specified. As used herein, the phrase "consisting essentially of" limits the scope of the embodiment to the specified elements, steps, ingredients, or components, and to those that do not materially affect the basic and novel characteristics of the claimed disclosure.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The term "about" has the meaning reasonably ascribed to it by a person of ordinary skill in the art when used in conjunction with a stated numerical value or range, i.e., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

A. Sheet and Coating Layer

Definitions used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, $3^{rd}$ Edition or a dictionary known to those of ordinary skill in the art.

The term "weatherproof" means sufficiently water resistant that a sheet, despite prolonged exposure to a wet environment, such as one created by substantial rainfall, retains its utility as a surface for legibly bearing machine printed or written images, or as a surface that can be written upon when wet or dry, using pen or pencil. More specifically, this means that the sheet resists falling apart when wet and also maintains a substantially intact and undisturbed surface. The weatherproof character of the sheet is largely a function of water repellency and wet strength. Water repellency refers to the ability of the sheet to resist wetting, that is, the passage of water into the structural components of the sheet through capillary action.

"Wet strength" refers to the tensile strength of the sheet when permeated or soaked with water, the strength being provided by bond between the components of the system (e.g., inter-fiber bonds, fiber-fiber cross-links, fiber-polymer cross-links, polymer-polymer cross-links, etc.) having resistance to attack by water. Without wishing to be bound by theory, strength is believed to be related to entanglement of fibers as well as addition of natural polymers and synthetic resin to pulp slurry during the manufacturing process, which creates a resistance to swelling, protects existing fiber bonds and forms new water resistant bonds. Wet strength can be determined by Tappi Test Method T456 and is routinely expressed as the ratio of wet to dry tensile force at break. Wet strength can be measured as the peak tensile force (in Newtons) at breakage for a sheet soaked in distilled water for a controlled period of time (e.g., 5 minutes; referred to as "wet strength method").

In one embodiment, a recyclable sheet comprising a substrate comprising a plurality of cellulose fibers and having two substantially planar sides, a coating layer comprising a plurality of first polymers, the coating layer being in direct contact and impregnantly covering at least a portion of one of the two sides of the substrate, and at least one cross-link between (i) one of the plurality of cellulose fibers and one of the plurality of first polymers (ii) two of the plurality of first polymers or (iii) two of the plurality of cellulose fibers is presented. In certain embodiments, the sheet comprises at least one cross-link between more than two components, for instance, between more than one of the cellulose fibers and more than one of the first polymers or combinations thereof.

In some embodiments, the sheet has a wet strength greater than 0 Newtons. In some more specific embodiments, the sheet has a wet strength greater than 100 Newtons. In some embodiments, the recyclable sheet has a wet strength greater than 200 Newtons, greater than 300 Newtons, greater than 400 Newtons, greater than 500 Newtons, greater than 600

Newtons, greater than 700 Newtons, greater than 800 Newtons, greater than 900 Newtons, greater than 1,000 Newtons, greater than 1,100 Newtons, greater than 1,200 Newtons, greater than 1,300 Newtons, greater than 1,400 Newtons, greater than 1,500 Newtons, greater than 1,600 Newtons, greater than 1,700 Newtons, greater than 1,800 Newtons, greater than 1,900 Newtons, greater than 2,000 Newtons, greater than 2,100 Newtons, greater than 2,200 Newtons, greater than 2,300 Newtons, greater than 2,400 Newtons, greater than 2,500 Newtons, greater than 2,600 Newtons, greater than 2,700 Newtons, greater than 2,800 Newtons, greater than 2,900 Newtons, or greater than 3,000 Newtons. In any of the forgoing examples, wet strength can be measured using the wet strength method or the Tappi Test Method T456.

"Alkyl" refers to a straight or branched hydrocarbon chain radical consisting solely of carbon and hydrogen atoms, which is saturated or unsaturated (i.e., contains one or more double (alkenyl) and/or triple bonds (alkynyl)), having, for example, from one to twenty-four carbon atoms ($C_1$-$C_{24}$ alkyl), four to twenty carbon atoms ($C_4$-$C_{20}$ alkyl), six to sixteen carbon atoms ($C_6$-$C_{16}$ alkyl), six to nine carbon atoms ($C_6$-$C_9$ alkyl), one to fifteen carbon atoms ($C_1$-$C_{15}$ alkyl), one to twelve carbon atoms ($C_1$-$C_{12}$ alkyl), one to eight carbon atoms ($C_1$-$C_8$ alkyl) or one to six carbon atoms ($C_1$-$C_6$ alkyl) and which is attached to the rest of the molecule by a single bond, e.g., methyl, ethyl, n-propyl, 1-methylethyl (iso propyl), n butyl, n pentyl, 1,1-dimethylethyl (t butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group is optionally substituted.

"Alkylamino" refers to the group —NRR', where R and R' are each independently either hydrogen or alkyl, and at least one of R and R' is alkyl. Alkylamino includes groups such as piperidino wherein R and R' form a ring. The term "alkylaminoalkyl" refers to -alkylene-NRR'.

"Alkylene" refers to a straight or branched divalent or multivalent hydrocarbon chain linking the rest of the molecule to a radical group or linking two or more radical groups, consisting solely of carbon and hydrogen, which is saturated or unsaturated (i.e., contains one or more double and/or triple bonds), and having from one to twelve carbon atoms, e.g., methylene, ethylene, propylene, n-butylene, ethenylene, propenylene, n-butenylene, propynylene, n-butynylene, and the like. The alkylene chain is attached to the rest of the molecule and/or radical group(s) through a single or double bond. The points of attachment of the alkylene chain to the rest of the molecule and/or to the radical group(s) can be through one carbon or any two carbons within the chain. Unless stated otherwise specifically in the specification, an alkylene chain is optionally substituted.

"Haloalkylene" refers to an alkylene, as defined above, wherein at least one H is replaced by a halogen radical, for example, fluoro, chloro, bromo, iodo, or combinations thereof. Unless otherwise stated specifically in the specification, a haloalkylene group is optionally substituted.

"Cycloalkyl" refers to a stable non-aromatic monocyclic or polycyclic carbocyclic radical consisting solely of carbon and hydrogen atoms, which may include fused or bridged ring systems, having from three to fifteen carbon atoms, preferably having from three to ten carbon atoms, and which is saturated or unsaturated and attached to the rest of the molecule by a single bond. Monocyclic radicals include, for example, cyclopropyl, cyclobutyl, cyclopentyl, cyclohexyl, cycloheptyl, and cyclooctyl. Polycyclic radicals include, for example, adamantyl, norbornyl, decalinyl, 7,7-dimethyl-bicyclo[2.2.1]heptanyl, and the like. A "cycloalkylene" is a divalent or multivalent cycloalkyl, which typically connects one portion of a molecule to a radical group or connects two or more radical groups. Unless otherwise stated specifically in the specification, a cycloalkyl (or cycloalkylene) group is optionally substituted.

"Heteroalkylene" refers to an alkylene group, as defined above, comprising at least one heteroatom (e.g., N, o, P or S) within the alkylene chain or at a terminus of the alkylene chain. In some embodiments, the heteroatom is within the alkylene chain (i.e., the heteroalkylene comprises at least one carbon-heteroatom-carbon bond). In other embodiments, the heteroatom is at a terminus of the alkylene and thus serves to join the alkylene to the remainder of the molecule (e.g., M1-H-A-M2, where M1 and M2 are portions of the molecule, H is a heteroatom and A is an alkylene). Unless stated otherwise specifically in the specification, a heteroalkylene group is optionally substituted.

"Haloheteroalkylene" refers to a heteroalkylene group, as defined above, wherein at least one hydrogen (H) is replaced by a halogen radical, for example, fluoro, chloro, bromo, iodo, or combinations thereof. Unless otherwise stated specifically in the specification, a haloheteroalkylene group is optionally substituted.

"Cycloheteroalkylene" refers to a heteroalkylene group, as defined above, further comprising a cycloalkylene as defined above (e.g., M1-H-A-Cy-M2, where M1 and M2 are portions of the molecule, H is a heteroatom, A is an alkylene, and Cy is a cycloalkylene. Unless otherwise stated specifically in the specification, a cycloheteroalkylene group is optionally substituted.

As used herein, "arylene" refers to a divalent or multivalent group which links a portion of a molecule to a radical group, two or more radical groups, or a portion of a first molecule to a portion of a second molecule. Unless stated specifically otherwise, an arylene is optionally substituted.

"Heteroaryl" refers to a 5- to 14-membered ring system radical comprising one to thirteen carbon atoms, one to six heteroatoms selected from the group consisting of nitrogen, oxygen and sulfur, and at least one aromatic ring. For purposes of this disclosure, the heteroaryl radical may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e.

thienyl). "Heteroarylene" is a divalent or multivalent heteroaryl radical. Unless stated otherwise specifically in the specification, heteroaryl and heteroarylene groups are optionally substituted.

As used herein, "haloheteroarylene" refers to a heteroarylene group, as defined above, wherein at least one H is replaced by a halogen radical, for example, fluoro, chloro, bromo, iodo, or combinations thereof. Unless otherwise stated specifically in the specification, a haloheteroarylene group is optionally substituted.

The term "substituted" used herein means any of the above groups (e.g., alkyl, alkylene, alkylamino, alkylaminoalkyl, alkoxy, aryl, arylene, carbocyclyl, cycloalkyl, cycloalkylene, cycloheteroalkylene, haloalkyl, haloalkylene, haloheteroalkylene, heteroalkylene, heterocyclyl, heteroaryl and/or heteroarylene) wherein at least one hydrogen atom is replaced by a bond to a non-hydrogen atom such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles.

For example, "substituted" includes any of the above groups in which one or more hydrogen atoms are replaced with —$NR_gR_h$, —$NR_gC(=O)R_h$, —$NR_gC(=O)R_h$, —$NR_gC(=O)NR_gR_h$, —$NR_gC(=O)OR_h$, —$NR_gSO_2R_h$, —$OC(=O)NR_gR_h$, —$OR_g$, —$SR_g$, —$SOR_g$, —$SO_2R_g$, —$OSO_2R_g$, —$SO_2OR_g$, =$NSO_2R_g$, and —$SO_2NR_gR_h$. "Substituted" also means any of the above groups in which one or more hydrogen atoms are replaced with —$C(=O)R_g$, —$C(=O)OR_g$, —$C(=O)NR_gR_h$, —$CH_2SO_2R_g$, —$CH_2SO_2NR_gR_h$. In the foregoing, $R_g$ and $R_h$ are the same or different and independently hydrogen, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an aminyl, cyano, hydroxyl, imino, nitro, oxo, thioxo, halo, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl group. In addition, each of the foregoing substituents may also be optionally substituted with one or more of the above substituents.

A "cellulose fibers" refers to fibrous molecules generally having the structure shown below:

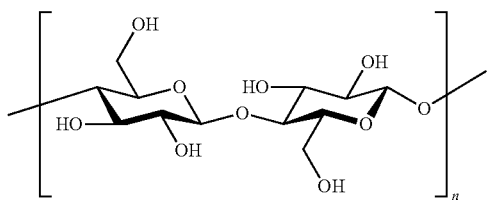

wherein n is an integer greater than 1, for example ranging from 1 to 15,000. A typical example of such a substrate is cellulosic paper. Cellulosic paper may comprise fibers such as wood fibers, cotton fibers, as well as other cellulosic fibers, including recycled cellulosic fibers. Particular embodiments are directed to a substrate that is paper comprising cellulose fibers, for example, cellulosic fibers from recycled paper. The substrate is said to be impregnantly covered with a coating layer, when the coating layer penetrates the surface of the substrate to at least some degree.

A "filler to provide block resistance" refers to an additive included in the coating layer to prevent surfaces in contact in a stack of weatherproof sheets, or in a roll of weatherproof sheet material, from sticking together. A filler to provide tooth for printability and writability refers to an additive included in the coating layer to impart to its surface a degree of texture or roughness required for printability or writability.

"Outthrows" refers to papers that are so manufactured or treated or are in such a form as to be unsuitable for recyclability or consumption as the specified by grade according to the Institute of Scrap Recycling Industries, Inc. ("ISM").

"Prohibitive materials" refers to (1) any materials which by their presence in a packing of paper stock, in excess of the amount allowed, will make the pack unstable as to the grade specified; (2) any material that may be damaging to equipment; and (3) any materials not substantially free of food debris, medical hazardous wastes and poisonous or other harmful substances or liquid.

A "cross-link" refers to a covalent molecular bridge or linkage between two or more components (e.g., between cellulose fiber(s) and cellulose fiber(s), between polymer(s) and polymer(s), between cellulose fiber(s) and polymer(s)). Both intra and inter-molecular covalent attachments of the aforementioned components and combinations are meant to be included.

"Cross-linking density" refers to a ratio of cross-linking moieties (i.e., isocyanate, isothiocyanate, aziridine, carbodiimide, etc.) to molecular weight of the cross-linking agent. A cross-linking agent having a higher cross-linking density has more cross-linking moieties than a cross-linking agent having a low cross-linking density when molecular weight is held constant. As used herein, the cross-linking density is expressed according to the following equation:

$$CD_{CA} = \frac{N_{CA}}{MW_{CA}} \times 100$$

wherein:

$CD_{CA}$ is the cross-linking density of the cross-linking agent, $N_{CA}$ is the number of cross-linking moieties on the cross-linking agent (e.g., isocyanate, isothiocyanate, aziridine, carbodiimide, etc.) and $MW_{CA}$ is the molecular weight of the cross-linking agent. For example, a cross-linking reagent having two isocyanate moieties and a molecular weight of 168.20 g/mol would have a cross-linking density of 1.19.

A "polymer" or "polymer molecule" refers to a chemical substance that has a molecular structure comprising a number of subunits (i.e., monomers or repeat units) bonded together to form a molecular chain or backbone. Polymers include, for example, nylon, polyvinyl chloride, polystyrene, polyethylene, polypropylene, polyacrylonitrile, polyacrylic acid, polyacrylate and the like. In some embodiments, the first polymer comprises at least one polyacrylic polymer, at least one polystyrene polymer, or combinations thereof.

In some embodiments, a first polymer or a second polymer is a copolymer. A "copolymer" refers to a polymer having more than one species of subunits included in the polymer backbone. A copolymer may be a block or random copolymer. In certain embodiments, a copolymer comprises at least one polyacrylic polymer and at least one polystyrene polymer.

"Acrylic polymer" or "polyacrylic polymer" refers to a polymer comprising the following structure:

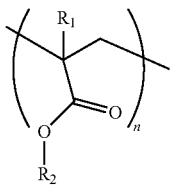

wherein $R_1$ is, at each occurrence, independently H or alkyl (e.g., methyl, ethyl), $R_2$ is, at each occurrence, independently H or alkyl (e.g., methyl, ethyl, butyl, 2-ethylhexyl) and n is an integer greater than 1. Additionally, polyacrylic polymers include polyacrylonitrile and polyacrylate polymers. Polyacrylic polymers also include, but are not limited to, polyacrylic acid, polymethacrylic acid, polymethyl methacrylate, poly butyl acrylate, or poly 2-ethylhexyl acrylate. In certain embodiments, a polyacrylic polymer comprises mixtures of polyacrylic polymers.

"Styrene polymer" or "polystyrene polymer" refers to polymer comprising the following structure:

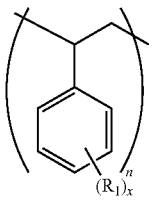

wherein $R_1$ is, at each occurrence, independently H, alkyl, haloalkyl, hydroxyl, alkoxy, or halo, x is an integer ranging from 0 to 5, and n is an integer greater than 1. Examples of polystyrene polymers include polystyrene.

A "styrene acrylic polymer" or "polystyreneacrylic polymer" refers to a copolymer comprising at least one polystyrene polymer and at least one polyacrylic polymer.

Such polymers and copolymers may be synthesized by methods well known in the art, for example, by emulsion copolymerization. Accordingly, in some embodiments, the coating layer further comprising a plurality of second polymers, for example, wherein the second polymers comprise are copolymer. In some more specific embodiments, the first polymer comprises a polyacrylic polymer the second polymer comprises a styrene acrylic copolymer. In another particular embodiment, the first and second polymers are the copolymers present in Lucidene® 605, an emulsion prepared and sold by the Rohm and Haas Company of Charlotte, North Carolina ("Rohm and Haas"). In yet another particular embodiment, the coating layer is derived from Rite in the Rain® Formula #22154A, a product manufactured and sold by Northwest Coatings Corp. of Oak Creek, Wisconsin ("NW Coatings").

The coating layer has certain properties related to the composition of the first polymer and/or the second polymer that can be changed or adjusted depending on the desired application. For example, in a specific embodiment, the density of the coating layer ranges from about 0.5 grams per square meter to about 10.0 grams per square meter, from about 1.0 grams per square meter to about 8.0 grams per square meter, from about 2.0 grams per square meter to about 7.0 grams per square meter, from about 3.0 grams per square meter to about 6.0 grams per square meter, from about 3.7 grams to about 5.6 grams per square meter or from about 5.6 grams to about 8.5 grams per square meter of the sheet (i.e., one or both of the planar surface(s) of the substrate).

In some embodiments, the coating layer has a moisture content less than 10% by weight, less than 8% by weight, less than 7% by weight, or less than 6% by weight based on the total weight of the coating layer. In some of the foregoing embodiments, the polymer or mixture of polymers content is less than 85% by weight, less than 75% by weight, less than 65% by weight, or less than 60% by weight, based on the total weight of the coating layer. In some more specific embodiments, the coating layer has a moisture content less than 10% by weight and the polymer or mixture of polymers content is less than 85% by weight, the coating layer has a moisture content less than 8% by weight and the polymer or mixture of polymers content is less than 75% by weight, the coating layer has a moisture content less than 7% by weight and the polymer or mixture of polymers content is less than 65% by weight, the coating layer has a moisture content less than 6% by weight and the polymer or mixture of polymers is less than 60% by weight, based on the total weight of the coating layer. In some embodiments, moisture content is synonymous with water content.

The moisture content of certain embodiments of sheets for use in a photocopier is pertinent to the operation of the machine. For example, it has been found that, if the water content is too high, the paper will interfere with the operation of the machine. If the water content is too low, the paper is too brittle to use in the machine and will cause it to jam. Accordingly, in another embodiment directed to a sheet for use in photocopiers and laser printers, the moisture content of the sheet ranges from about 4 percent to about 7 percent, by weight of the sheet.

In some embodiments, the coating layer further comprises a filler to provide block resistance. In some embodiments the coating layer further comprises a filler to provide tooth for printability and writability. In some embodiments, the coating layer further comprises a pigment. In various embodiments, the filler to provide block resistance comprises barium sulfate, the filler to provide tooth comprises calcium carbonate, and the pigment comprises titanium dioxide, respectively. The amount of barium sulfate, in one embodiment, ranges from greater than 0% by weight to about 65% by weight, about 17% by weight, or about 38% by weight, based on the total weight of the coating layer. In some of those embodiments the coating layer has a moisture content of 5% by weight. In another embodiment, the filler to provide block resistance comprises clay, mica, aluminum trihydrate, or mixtures thereof.

Weatherproof sheets having a color other than white are also disclosed. The color may be obtained by providing a colored substrate, or by providing a color tinting agent in the coating layer, wherein the color tinting agent comprises an organic or inorganic pigment dispersed in an acrylic resin or other suitable media.

In certain embodiments of the foregoing, the coating layer further comprises a wax. The amount of the wax is such that water beads up on a coating layer surface that is also printable and writable. In addition to providing water resistance and causing water to bead up on the coating layer surface, the wax also provides block resistance and scratch/mar resistance. In one embodiment, the wax is paraffin wax, a polypropylene-wax mixture, a polyethylene-wax mixture, carnauba wax, microcrystalline wax, montan wax, a Fisher-Tropsch wax, beeswax, or a mixture thereof.

In other specific related embodiments, respectively, the amount of the first polymer or combination of first and second polymers (e.g., a mixture of the first and second polymer) ranges from about 30% to about 65% by weight, while the amount of the wax ranges from about 1.5% to about 9.5% by weight; the amount of the first polymer or combination of first and second polymers is about 50% by weight, while the amount of the wax is about 2.5% by weight, where the recited amounts are based on the total weight of the coating layer and the coating layer having a moisture content of 5% by weight. In other specific related embodiments, respectively, the amount of the first polymer or combination of first and second polymers ranges from about 30% to about 82%, while the amount of the wax ranges from about 1.5% to about 13%; the amount of the first polymer or combination of first and second polymers is about 52.5%, while the amount of the wax is about 2.7%, where the recited amounts are based on the total weight of the coating layer and the coating layer having a moisture content of 5% by weight.

A particular thickness or dimensions of the substrate is selected based on performance for a desired application. Accordingly, in some embodiments the thickness of the substrate or paper ranges from 0.003 inches to 0.013 inches or from 0.004 inches to 0.006 inches. Another related embodiment is directed to an architectural or construction drawing prepared by printing the drawing onto a sheet of one of the foregoing embodiments using a large format photocopier or laser printer, where the substrate or paper has dimensions suitable for such large format printing. Accordingly, in certain embodiments, the sheet has the dimensions of an architectural or construction drawing.

By way of an additional example, a substrate as described herein includes paper having the specifications described by the United States Government Publishing Office (GPO). Specific examples include, but are not limited to, printing paper water-resistant (text) book paper (JCP A220), 50 pct map lithographic-finish (JCP E10), high wet strength map lithographic-finish (JCP E20), offset map lithographic finish (JCP E30), chemical wood map lithographic finish (JCP E40) and 50 pct chart and lithographic-finish (JCP E50).

It has been surprisingly found that cellulosic substrates, when treated as described above, yield sheets that are weatherproof and that can bear printing applied by conventional printing methods such as lithography, screen printing, letter press, flexography, slot dye, rotogravure and the like. Also, according to embodiments described herein, sheets can be written upon using a pencil or an all-weather pen, even when the surface is wet, without ink feathering or paper tearing.

Some of the foregoing embodiments of the sheets described above would not be suitable for use in photocopiers and laser printers. Accordingly, other embodiments include sheets bearing images printed directly onto the coating layer, as well as books and notepads comprising a plurality of the sheets intended for use outdoors or in otherwise wet environments. Further, the weatherproof sheets of the above-disclosed embodiments are non-yellowing, biodegradable, re-pulpable and recyclable.

In another embodiment, a sheet that is suitable for use in a photocopier or laser printer is provided. In such an embodiment, as is the case for the sheets disclosed above, the sheet comprises a substrate comprising a plurality of cellulose fibers and having two substantially planar sides, a coating layer comprising a plurality of first polymers, the coating layer being in direct contact and impregnantly covering at least a portion of one of the two sides of the substrate and at least one cross-link between (i) one of the plurality of cellulose fibers and one of the plurality of first polymers (ii) two of the plurality of first polymers or (iii) two of the plurality of cellulose fibers.

In any of the foregoing embodiments, the coating layer comprises a first polymer and may optionally comprise a second polymer, for example, a copolymer or mixture of copolymers comprising at least one polystyrene polymer and at least one polyacrylic polymer, a wax, a filler to provide block resistance, a filler to provide tooth for printability and writability, and a pigment. However, for this embodiment, the coating layer comprises substantially no titanium dioxide pigment or calcium carbonate filler. In some of the foregoing embodiments, the coating layer comprises an optical brightener.

In further related embodiments, respectively, the sheet further comprises an additive, such as polyamide, to enhance its wet strength, and the sheet is a color other than white.

In general, the cross-linker forms a covalent bond between a cross-linking agent and a substrate (e.g., cellulose fiber, polymer, cross-linker, additive etc.) through a chemical reaction. The cross-linking agents generally comprise chemical moieties that are able to react to form such linkages. In some embodiments, a covalent bond is formed between a substrate, a polymer, a cross-linker, or combinations thereof. In certain related embodiments, the covalent bond is formed by reaction of an isocyanate, an isothiocyanate, an aziridine, a carbodiimide or combinations thereof, which is attached to a cross-linking agent. Accordingly, in certain embodiments, the at least one cross-link comprises one of the following structures (I), (II), (III) or (IV):

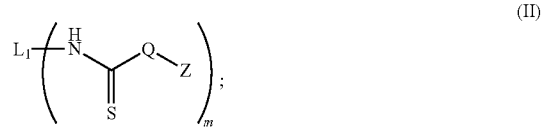

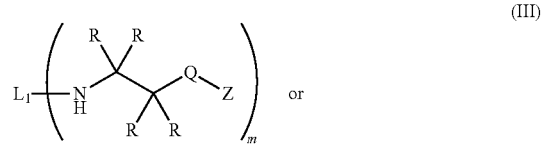

wherein:

L₁ is a multi-valent linker comprising optionally substituted alkylene, haloalkylene, cycloalkylene, heteroalkylene, haloheteroalkylene, cycloheteroalkylene, arylene, haloarylene, or haloheteroarylene;

m is an integer greater than 1;

Q is O, S or NR$^a$, wherein R$^a$ is H or alkyl;

R is at each occurrence, independently H, alkyl, cycloalkyl, alkylaminoalkyl or halo; and Z is at each occurrence, independently H, one of the plurality of polymer molecules or one of the plurality of cellulose fibers, provided that Z is not H for at least two occurrences.

In more specific embodiments, the cross-link comprises the following structure (I):

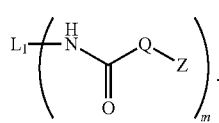
(I)

In some embodiments, the cross-link comprises the following structure (II):

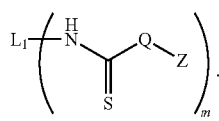
(II)

In some more specific embodiments, the cross-link comprises the following structure (III):

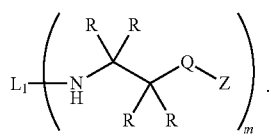
(III)

In certain embodiments, the cross-link comprises the following structure (IV):

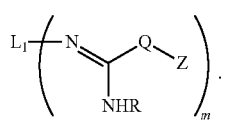
(IV)

Without wishing to be bound by theory, Applicants have discovered that cross-linking density can have a significant effect on wet strength as well as drying and curing times. Accordingly, in certain embodiments, the cross-linking agent has a crosslinking density ranging from greater than 0 to less than 10. In some embodiments, the cross-linking agent has a crosslinking density ranging from greater than 0 to less than 3. In some more specific embodiments, the cross-linking agent has a crosslinking density ranging from greater than 0 to less than 2.

In certain specific embodiments, the cross-linking agent has a cross-linking density ranging from 0.01 to 3.00, from 0.01 to 2.00, from 0.01 to 1.50, from 0.01 to 1.40, from 0.01 to 1.30, from 0.01 to 1.20, from 0.01 to 1.30, from 0.01 to 1.25, from 0.01 to 1.20, from 0.01 to 1.15, from 0.01 to 1.10, from 0.01 to 1.05, from 0.01 to 1.00, from 0.01 to 0.95, from 0.01 to 0.90, from 0.01 to 0.85, from 0.01 to 0.80, from 0.01 to 0.75, from 0.01 to 0.65, from 0.01 to 0.60, from 0.01 to 0.55, from 0.01 to 0.50, from 0.01 to 0.45, from 0.01 to 0.40, from 0.01 to 0.35, from 0.01 to 0.30, from 0.01 to 0.25, from 0.01 to 0.20, from 0.01 to 0.15, from 0.01 to 0.10, or from 0.01 to 0.05.

In some embodiments, the cross-linking agent has a cross-linking density ranging from 0.05 to 3.00, from 0.15 to 3.00, from 0.10 to 3.00, from 0.15 to 3.00, from 0.20 to 3.00, from 0.25 to 3.00, from 0.30 to 3.00, from 0.35 to 3.00, from 0.40 to 3.00, from 0.45 to 3.00, from 0.50 to 3.00, from 0.55 to 3.00, from 0.60 to 3.00, from 0.65 to 3.00, from 0.70 to 3.00, from 0.75 to 3.00, from 0.80 to 3.00, from 0.85 to 3.00, from 0.90 to 3.00, from 0.95 to 3.00, from 1.00 to 3.00, from 1.05 to 3.00, from 1.10 to 3.00, from 1.15 to 3.00, from 1.20 to 3.00, from 1.25 to 3.00, from 1.30 to 3.00, from 1.40 to 3.00, from 1.50 to 3.00, from 2.00 to 3.00, or from 2.50 to 3.00.

Certain embodiments of the present disclosure relate to paper and paper products that can be recycled using conventional techniques. Certain embodiments of the present disclosure meet grade definitions set forth by the Institute of Scrap Recycling Industries' *Scrap Specifications Circular* (2016), which is incorporated herein by reference in its entirety, specifically pages 28-31. Accordingly, in some of the foregoing embodiments, the sheet is Grade 1 through 52 stock, 1-S through 36-S stock, or combinations thereof. In some specific embodiments, the sheet is Grade 1, Grade 2, Grade 3, Grade 10, Grade 17, Grade 22, Grade 25, Grade 26, Grade 27, Grade 28, Grade 30, Grade 31, Grade 35, Grade 36, Grade 37, Grade 40, Grade 41, Grade 43, Grade 44, Grade 45, Grade 17-S, Grade 18-S, Grade 19-S, Grade 20-S, Grade 22-S, or any combination thereof. In certain embodiments, outthrows do not exceed 5%, 4%, 3%, 2%, 1%, 0.5%, 0.4%, 0.3% 0.2%, 0.1% or 0%. In certain embodiments, prohibited materials do not exceed 5%, 4%, 3%, 2%, 1%, 0.5% 0.4%, 0.3% 0.2%, 0.1% or 0%.

B. Composition

In one embodiment, a composition comprises a substrate comprising a plurality of cellulose fibers and having two substantially planar sides, a plurality of first polymers comprising at least one polyacrylic polymer, and a cross-linking agent, wherein the cross-linking agent has one of the following structures (I'), (II'), (III'), or (IV'):

(I')

(II')

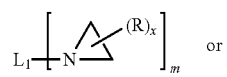 or
(III')

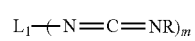
(IV')

wherein:

L₁ is a multi-valent linker comprising an optionally substituted alkylene, haloalkylene, cycloalkylene, heteroalkylene, haloheteroalkylene, cycloheteroalkylene, arylene, haloarylene, or haloheteroarylene;

m is an integer greater than 1;
x is 0, 1, 2, 3, or 4; and
R is at each occurrence, independently H, alkyl, cycloalkyl, alkylaminoalkyl or halo.

In some specific embodiments, the cross-linking agent has the following structure (I'):

     (I')

In some specific embodiments, the cross-linking agent has the following structure (II'):

     (II')

In some specific embodiments, the cross-linking agent has the following structure (III'):

     (III')

In some specific embodiments, the cross-linking agent has the following structure (III'):

     (IV')

In some more specific embodiments, $L_1$ is selected from hexamethylene, 4,4'-diphenylmethylene, methyl-phenylene, and phenylene. In some embodiments, $L_1$ is selected from 1,1'-[2-ethyl-2-[[3-(2-methyl-1-aziridinyl)-1-oxopropoxy]methyl]-1,3-propanediyl] ester and 1,1'-[2-[[3-(1-aziridinyl)-1-oxopropoxy]methyl]-2-(hydroxymethyl)-1,3-propanediyl] ester. In some specific embodiments, the cross-linking reagent is Desmodur VPLS2397 and the first polymer further comprises a polystyrene polymer. In some embodiments, the cross-linking agent is an isocyanate (i.e., —NCO) containing aliphatic urethane polyacrylic polymer.

In some embodiments, the cross-linking agent is selected from Table 1 below.

TABLE 1

Specific examples of cross-linking agents.

| Trade Name | Manufacturer | Class† | Trade Name | Manufacturer | Class† |
|---|---|---|---|---|---|
| Basinet ® HW 1000 | BASF | I | CARBODILITE ™ V-10 | GSI Exim America, Inc. | C |
| Basonat ® HW 1180 PC | BASF | I | CARBODILITE ™ V-04 | GSI Exim America, Inc | C |
| Basonat ® HW 2000 | BASF | I | CARBODILITE V-02B | GSI Exim America, Inc | C |
| Bayhydur ® 302 | Covestro | I | CARBODILITE ™ V-02-L2 | GSI Exim America. Inc | C |
| Bayhydur ® BL 5335 | Covestro | I | CARBODILITE ™ E-02 | GSI Exim America, Inc | C |
| Bayhydur ® BL XP 2706 | Covestro | I | CARBODILITE ™ V-02 | GSI Exim America, Inc | C |
| Bayhydur ® HD 2018 | Covestro | I | CARBODILITE ™ SV-02 | GSI Exim America, Inc. | C |
| Bayhydur ® XP 2547 | Covestro | I | CARBODILITE E-05 | GSI Exim America, Inc. | C |
| Bayhydur ® XP 7165 | Covestro | I | Picassian ® XL-701 | Stahl Polymers | C |
| Desmodur ® E 14 | Covestro | I | Picassian ® XL-702 | Stahl Polymers | C |
| Desmodur VPLS2396 | Covestro | I | Picassian ® XL-725 | Stahl Polymers | C |
| Bayhydur 401-70 | Covestro | I | Picassian ® XL-732 | Stahl Polymers | C |
| Desmodur XP 2510 | Covestro | I | Joncryl ® 540 | BASF | SC |
| Bayhydur 305 | Covestro | I | RAYCORE ® 9021A | Specialty Polymers, Inc. | SC |
| Bayhydur 2547 | Covestro | I | RayCryl ® 4100 | Chan Sieh Enterprises Co, Ltd. | SC |
| Desmodur HL BA | Covestro | I | PB-155 | Chan Sieh Enterprises Co, Ltd. | SC |
| Desmolux XP 2666 | Covestro | I | P-125U | Chan Sieh Enterprises Co, Ltd. | SC |
| Bayhydur 401-70 | Covestro | I | P-145U | Chan Sieh Enterprises Co, Ltd. | SC |
| Byhydur 2547 | Covestro | I | P-155U | Chan Sieh Enterprises Co, Ltd. | SC |
| AM-1091 | Quaker Color | I | P-103 | Chan Sieh Enterprises Co, Ltd. | SC |
| AM-1345XL | Quaker Color | I | EPS ® 2293 | EPS Materials | SC |
| AM-636 | Quaker Color | I | EPS ® 2548 | EPS Materials | SC |

TABLE 1-continued

Specific examples of cross-linking agents.

| Trade Name | Manufacturer | Class† | Trade Name | Manufacturer | Class† |
|---|---|---|---|---|---|
| AS-500 | Quaker Color | I | EPS ® 4203 | EPS Materials | SC |
| Hydrorene 10 | S.A.P.I.C.I. SpA | I | EPS ® 2507 | EPS Materials | SC |
| Hydrorene 33 | S.A.P.I.C.I. SpA | I | A-410 | Chan Sieh Enterprises Co, Ltd. | SC |
| Hydrorene AW 1 | S.A.P.I.C.I. SpA | I | F-45 | Chan Sieh Enterprises Co, Ltd. | SC |
| Akuacure 1070N | T&L Co., Ltd. Polymer Technology Centre | I | WorléeCryl ® 7410 | Worlée-Chemie G.m.b.H. | SC |
| Akuacure 1073N | T&L Co., Ltd. Polymer Technology Centre | I | StanChem 6470 | StanChem, Inc | SC |
| Akuacure 3100F | T&L Co., Ltd. Polymer Technology Centre | I | RayCryl ® 709 | Specialty Polymers | SC |
| Akuacure 3300FN | T&L Co., Ltd. Polymer Technology Centre | I | SETAQUA ™ 6766 | Nuplex Resins LLC | SC |
| Akuacure 4000N | T&L Co., Ltd. Polymer Technology Centre | I | EPS ® 2570 | EPS Materials | SC |
| Akuacure 4002B | T&L Co., Ltd. Polymer Technology Centre | I | PLIOTEC ® SC55 | Omnova Solutions | SC |
| Akuacure 8004N | T&L Co., Ltd. Polymer Technology Centre | I | PLIOTEC ® CR30 | Omnova Solutions | SC |
| Akuacure 8100N | T&L Co., Ltd. Polymer Technology Centre | I | Joncryl ® 2982 | BASF | SC |
| Akuacure 8103N | T&L Co., Ltd. Polymer Technology Centre | I | RAYCRYL ® 1120 | Specialty Polymers, Inc. | SC |
| Akuacure W3000 | T&L Co., Ltd. Polymer Technology Centre | I | RayCryl ® 4102 | Specialty Polymers, Inc. | SC |
| Easaqua X D M 501 | Vencorex | I | Ottopol SX-30 | Gellner Industrial, LLC | SC |
| Easaqua X D 401 | Vencorex | I | Ottopol SX-50 | Gellner Industrial, LLC | SC |
| Easaqua ™ M 502 | Vencorex | I | Ottopol SX-75 | Gellner Industrial, LLC | SC |
| Easaqua ™ WAT-3 | Vencorex | I | Ottopol SX-100 | Gellner Industrial, LLC | SC |
| Easaqua ™ WAT-4 | Vencorex | I | Unithane SX-482 NF | Union Specialties, Inc | SC |
| Easaqua ™ X D 803 | Vencorex | I | PLIOTEC ® SC105 | Omnova Solutions | SC |
| Easaqua ™ X L 600 | Vencorex | I | Texicryl ® 13-220 | Scott Bader | SC |
| WANNATE ® IPDI Monomer | Wanhua Chemical Group Co., Ltd. | I | BT-WBE1133 | BELIKE Chemical Co., Ltd. | SC |
| Crosslinker ® CX-100 | DSM Coating Resins, LLC. | A | Joncryl ® 1980 | BASF Dispersions & Resins | SC |
| PZ-28 | Polyaziridine | A | ROSHIELD ™ 4000 | Dow Coating Materials | SC |
| PZ-33 | Polyaziridine | A | Picassian ® AC-192 | Stahl Polymers | SC |

TABLE 1-continued

Specific examples of cross-linking agents.

| Trade Name | Manufacturer | Class† | Trade Name | Manufacturer | Class† |
|---|---|---|---|---|---|
| CARBODILITE ™ SW-12 G | GSI Exim America, Inc | C | Joncryl ® 1987 | BASF Dispersions & Resins | SC |
| CARBODILITE ™ E-03A | GSI Exim America, Inc | C | CARBODILITE ™ SV-02 | GSI Exim America, Inc. | C |
| No. 219 Isocyanate | Nexeo Solutions | C | Bayhydur XP 2655 | Covestro | I |
| Lupranate ® MM103 | Nexeo Solutions | C | — | — | — |
| Lupranate ® 5143 | Nexeo Solutions | C | — | — | — |

†C = carbodiimide, I = Isocyanate, A = Aziridine, SC = Self-Cross-linker

In certain embodiments, the cross-linking agent is covalently bound to the first polymer (a "self-cross-linking polymer"). In some embodiments, the composition further comprises a surfactant. Example surfactants include, but are not limited to, those found in Table 2 below.

TABLE 2

Specific Examples of surfactants.

| Trade Name | Manufacturer | Trade Name | Manufacturer |
|---|---|---|---|
| Carbowet GA 210 | Air Products/Evonic | Carbowet GA 211 | Air Products/Evonic |
| Carbowet GA 100 | Air Products/Evonic | COATOSIL* 1221 | Momentive |
| Carbowet 100 | Air Products/Evonic | ECOSURF LF-20 | Dow Coating Materials |
| Carbowet 106 | Air Products/Evonic | ECOSURF LF-30 | Dow Coating Materials |
| Carbowet 109 | Air Products/Evonic | ECOSURF LF-45 | Dow Coating Materials |
| Carbowet 107L | Air Products/Evonic | XOANONS WE-D9015 (Fluorine) | Anhui Xoanons Chemical Co., Ltd. |
| Strodex PK-85NV | Ashland | Dynol 800 | Air Products/Evonic |
| Maxemul 5010 (Copolymerizable Nonionic) | Croda Coatings & Polymers | Dynol 810 | Air Products/Evonic |
| LoVOCoat Form 100 (Polymeric) | Croda Coatings & Polymers | Sufynol 485 | Air Products/Evonic |
| SURFONAMINE L-207 (Amine) | Huntsman Performance Products | Surfynol 465 | Air Products/Evonic |
| Surfonic NB-407 | Nexeo Solutions | Carbowet 138 | Air Products/Evonic |
| Dynol 960 | Air Products/Evonic | Surfynol 420 | Air Products/Evonic |
| LoVOCoat Stable 100 (Polymeric) | Croda Coatings & Polymers | Surfynol 485W | Air Products/Evonic |
| Strodex FT-428 | Ashland | Surfynol 440 | Air Products/Evonic |
| Dynol 980 | Air Products/Evonic | Dynol 604 | Air Products/Evonic |
| Dynol 607 | Air Products/Evonic | Surfynol 61 | Air Products/Evonic |
| Surfynol AD01 | Air Products/Evonic | Surfynol 104 | Air Products/Evonic |
| Surfynol 500S | Air Products/Evonic | COATOSIL* 1220 | Momentive |
| Dynol 360 | Air Products/Evonic | Surfynol 104A | Air Products/Evonic |
| Dextrol OC-20 (Phosphate Ester) | Ashland | Surfynol 104S | Air Products/Evonic |
| Surfynol 2502 | Air Products/Evonic | Surfynol 104BC | Air Products/Evonic |
| Dextrol OC-78N (Phosphate Ester) | Ashland | XOANONS WE-D8950B | Anhui Xoanons Chemical Co., Ltd. |
| Dextrol OC-5075 (Phosphate Ester) | Ashland | Surfynol 104DPM (Fluorine) | Air Products/Evonic |
| Maxemul 6112 (Copolymerizable Anionic) | Croda Coatings & Polymers | XOANONS WE-8900 | Anhui Xoanons Chemical Co., Ltd. |
| Dextrol OC-180HS (Phosphate Ester) | Ashland | Surfynol 104E | Air Products/Evonic |
| Maxemul 6106 (Anionic Surfactant) | Croda Coatings & Polymers | Surfynol 104PG-50 | Air Products/Evonic |
| Maxemul 5011 (Copolymerizable Nonionic) | Croda Coatings & Polymers | XOANONS WE-D8975B | Anhui Xoanons Chemical Co., Ltd. |
| Carbowet GA-221 | Air Products/Evonic | Surfynol 104PA | Air Products/Evonic |
| Surfynol 104H | Air Products/Evonic | Tween 40 | Croda Coatings & Polymers |
| XOANONS WE-D-8987 (Fluorine) | Anhui Xoanons Chemical Co., Ltd. | Brij O2 | Croda Coatings & Polymers |

TABLE 2-continued

Specific Examples of surfactants.

| Trade Name | Manufacturer | Trade Name | Manufacturer |
|---|---|---|---|
| XOANONS WE-D9055 (Fluorine) | Anhui Xoanons Chemical Co., Ltd. | Tween 21 | Croda Coatings & Polymers |
| Dow Corning 1250 | Nexeo Solutions | Span 85 | Croda Coatings & Polymers |
| AC-703 (Anionic Fluorocarbon) | Ark (Fogang) Chemicals Industry Co., Ltd. | Brij O20 | Croda Coatings & Polymers |
| Hostapal BV (concentrated) | Clariant Coatings & Construction Chemicals | E-SPERSE 701 | Ethox Chemicals |
| Genapol PF 40 | Clariant Coatings & Construction Chemicals | Octosol 571 | Tiarco Chemicals |
| Hostapur OS (Liquid) | Clariant Coatings & Construction Chemicals | Brij S2 | Croda Coatings & Polymers |
| ZetaSperse 179 Dispersant | Air Products/Evonic | Brij S10 | Croda Coatings & Polymers |
| ZetaSperse 182 Dispersant | Air Products/Evonic | E-SPERSE 702 | Ethox Chemicals |
| NOVEL TDA-20 ETHOXYLATE | Sasol Performance Chemicals | Brij C2 | Croda Coatings & Polymers |
| NOVEL TDA-30 ETHOXYLATE | Sasol Performance Chemicals | Brij L23 | Croda Coatings & Polymers |
| NOVEL TDA-40 ETHOXYLATE | Sasol Performance Chemicals | Abeson Na 50 | Enapol AS |
| NOVEL 12D20 ETHOXYLATE | Sasol Performance Chemicals | Brij C20 | Croda Coatings & Polymers |
| NOVEL TDA-4070 ETHOXYLATE | Sasol Performance Chemicals | Brij S20 | Croda Coatings & Polymers |
| Emulsogen EPA 1954 | Clariant Coatings & Construction Chemicals | Brij O10 | Croda Coatings & Polymers |
| Genapol PF 20 | Clariant Coatings & Construction Chemicals | Brij S100 | Croda Coatings & Polymers |
| E-SPERSE 700 | Ethox Chemicals | Abeson Na 30 | Enaspol AS |
| E-SPERSE 703 | Ethox Chemicals | Brij L4 | Croda Coatings & Polymers |
| Masurf FS-630 | Pilot Chemical | Abeson | Enaspol AS |
| Flexisurf EHDP | Innovative Chemical Technologies Inc. | Masil SF19 | Emerald PerformanceMaterials |
| Brij S721 | Croda Coatings & Polymers | Genamin BTMS | Clariant Coatings & Construction Chemicals |

In any of the foregoing embodiments, the substrate is paper as described herein above.

C. Method

In one embodiment, a method for coating a substrate is provided, the method comprising:

i. providing a substrate comprising a plurality of cellulose fibers and having two substantially planar sides; and ii. contacting the substrate with a composition comprising a plurality of first polymers and a cross-linking agent thereby forming:

a) a coating layer, comprising the plurality of first polymers, the coating layer being in direct contact and impregnantly covering at least a portion of one of the two sides of the substrate; and b) at least one cross-link between:

i) one of the plurality of cellulose fibers and one of the plurality of first polymers;

ii) two of the plurality of first polymers; or iii) two of the plurality of cellulose fibers.

In some embodiments, the cross-linking agent is the cross-linking agent is as described in any of the foregoing embodiments. In some related embodiments, the contacting forms at least one of the following structures (I"), (II"), (III") or (IV"):

(I')

(II')

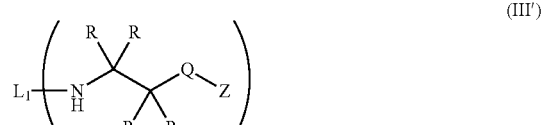
(III')

or

-continued

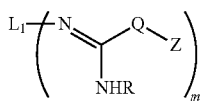

wherein:

L₁ is a multi-valent linker comprising optionally substituted alkylene, haloalkylene, cycloalkylene, heteroalkylene, haloheteroalkylene, cycloheteroalkylene, arylene, haloarylene, haloheteroarylene;

m is an integer greater than 1;

Q is O, S or $NR^a$, wherein $R^a$ is H or alkyl;

R is at each occurrence, independently H, alkyl, cycloalkyl, alkylaminoalkyl or halo; and Z is at each occurrence, independently H, one of the first polymers or one of the cellulose fibers, provided that Z is not H for at least two occurrences.

In certain related embodiments, the contacting forms the following structure (I'):

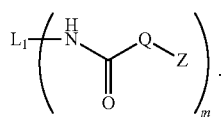

In some other related embodiments, the contacting forms the following structure (II'):

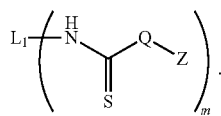

In specific related embodiments, the contacting forms the following structure (III'):

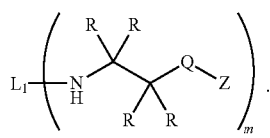

In related embodiments, the contacting forms the following structure (IV'):

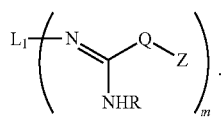

In another specific related embodiment, the composition is aqueous. In some of those embodiments, the amount of aqueous composition applied during the contacting is 2.6 pounds to 3.9 pounds per ream of cellulosic substrate per side. As is understood by those skilled in the art, a ream refers to a quantity of 500 sheets, each sheet being 17 inches wide and 22 inches long.

In further specific related embodiments, the first polymer or first and second polymers of the composition used for contacting is a copolymer or a mixture of copolymers. In some of those embodiments, the polymer is emulsified and the composition further comprises an emulsified wax. In some specific embodiments, the amount of emulsified copolymer or mixture of copolymers ranges from about 40% by weight to about 80% by weight, while the amount of the emulsified wax ranges from about 3% by weight to about 20% by weight; the amount of the emulsified copolymer or mixture of copolymers is about 64% by weight, while the amount of the emulsified wax is about 5.3% by weight, where the recited amounts are based on the total weight of the composition. Again, the amount of the emulsified wax is selected so that water beads up on a coating layer surface that is also printable and writable.

In further related embodiments, the composition further comprises a filler to provide block resistance, a filler to provide tooth, a pigment, or a mixture thereof. In those embodiments, respectively, the filler to provide block resistance comprises barium sulfate present in an amount ranging from greater than 0% by weight to about 40% by weight of the composition, the filler to provide tooth comprises calcium carbonate present in an amount ranging from greater than about 0% by weight to about 10% by weight of the composition, and the pigment comprises titanium dioxide present in an amount ranging from about 5% by weight to about 15% by weight of the composition.

The composition, in another related embodiment, contacting is done by a method that uses a flexographic process, rotogravure, an air knife, a knife coat, a reverse doctor, a Meyer rod, immersion, spray, slot dye, roll nip or combinations thereof. Such processes are generally known to those skilled in the art. An example of a flexographic process of this embodiment is one that employs a series of rotating cylinders that pick up, transfer and apply or contact the composition to the substrate. An enclosed doctor blade meters the coating onto a textured anilox roller that, in turn, transfers the coating to a variable speed printing sleeve. The latter imprints the composition onto a moving web of the substrate. The coating weight is computer monitored to maintain consistency.

The contacted substrate is dried, in another related embodiment, using an infrared drier and air knife so as to yield a sheet having a moisture content ranging from about 3% by weight to about 10% by weight of the sheet. A moisture content that is too low will result in the sheet being too brittle. A moisture content that is too high can result in curling, blocking, a gummy coating layer, and other undesirable characteristics.

In another related embodiment, a sheet made by the above method is provided.

An embodiment is also directed to a method of making a sheet suitable for use in a photocopier or laser printer, the method comprising the same basic steps as those of the above-described method. Also, the related specific embodiments parallel those of the method above, with some exceptions. For the method of this embodiment, the composition used in the contacting step comprises substantially no calcium carbonate filler or titanium dioxide pigment. In specific embodiments, respectively, the amount of emulsified copolymer or mixture of copolymers ranges from about 40% by weight to about 80% by weight, while the amount of the emulsified wax ranges from about 3% by weight to about 20% by weight; the amount of the emulsified copolymer or mixture of copolymers is about 67% by weight, while the amount of the emulsified wax is about 5.5% by weight, where the recited amounts are based on the total weight of the composition. As before, the amount of the emulsified wax is selected so that water beads up on a coating layer surface that is also printable and writable.

Also, in particular embodiments, respectively, the composition comprises Clear Rite in the Rain® Formula #22560B, manufactured and sold by NW Coatings; the amount of composition applied during contacting ranges from 1.7 to 2.6 pounds per ream per side; and during contacting, the composition is impregnantly applied by a method that uses a flexographic process, rotogravure, an air knife, a knife coat, a reverse doctor, a Meyer rod, immersion, spray, slot dye, roll nip, or combinations thereof. As before, in a related embodiment, the emulsified mixture of copolymers is Lucidene® 605, a product prepared and sold by Rohm and Haas.

Further, in another particular embodiment, barium sulfate is used as the filler to provide block resistance, as the filler to provide tooth, and as the pigment, where the amount of barium sulfate, in one embodiment, ranges from greater than 0% by weight to about 40% by weight, and the amount, in another embodiment, is about 23% by weight. The recited amounts are based on the total weight of the composition.

Finally, in yet another particular embodiment, the drying step is carried out using infrared dryers and air knives so as to yield a weatherproof sheet having a moisture content ranging from about 4% by weight to about 7% by weight by weight of the weatherproof sheet. By way of illustration, during the drying step, the substrate having the composition applied thereon may be maintained at 200° F. until the desired moisture content is obtained.

In another related embodiment, to a sheet, usable in a photocopier and laser printer, made by the method described in the preceding paragraph is provided.

From the foregoing it will be appreciated that, although specific embodiments have been described herein for purposes of illustration, various modifications may be made without deviating from the spirit and scope of this disclosure. Accordingly, this disclosure is not limited except as by the appended claims.

EXAMPLES

Example 1

Application of Polymer/Cross-Linker Composition to Substrate

Samples were prepared using standard flexography techniques. In general, a fountain roller is used to transfer the polymer/cross-linker mixture to the metering roller. The metering roller carries a desired amount of the polymer/cross-linker mixture and deposits it to flexibly mounted printing plate mounted on the plate cylinders. This ensures the coating layer is deposited with a uniform thickness. A doctor blade is optionally employed to scrape the metering roller, if needed. An impression cylinder then applies pressure to the plate cylinder to transfer the mixture only the substrate. Sample drying is optionally used (e.g., infrared radiation) as a final step in the process.

Example 2

Wet Strength Method

Samples were prepared according to Example 1, using five replications for each sample preparation to be tested. Samples were treated with a mixture of styrene acrylic polymer (i.e., weather proof coating saturant) and cross-linker at 3% by weight as indicated in Table 3 below.

TABLE 3

Sample preparation compositions with various cross-linkers.

| Sample | Cross-linker Trade Name | Cross-linker Type |
|---|---|---|
| Control | None | — |
| 2 | PZ-28 | aziridine |
| 3 | AM 1345XL | isocyanate |
| 4 | AM 1091 | isocyanate |
| 5 | Desmodur VPLS2397 | isocyanate |
| 6 | Bayhydur 401-70 | isocyanate |
| 7 | Desmodur XP 2510 | isocyanate |
| 8 | Desmodur HL BA | isocyanate |
| 10 | Bayhydur 302 | isocyanate |
| 11 | Bayhydur ® XP 2547 | isocyanate |
| 12 | Bayhydur 305 | isocyanate |
| 13 | Desmolux XP 2666 | isocyanate |
| 15 | PZ-33 | aziridine |

Control samples were coated using the same polymer mixture but without any cross-linker present. Paper sample types were 24 pound recycled paper ("RP").

Coated paper was cut in to ½ inch×10 inch strips using a Cheminstruments ½ inch specimen cutter (part no. SC-050). Care was taken to keep the instrument blades sharp to ensure clean edges were maintained. The end of each strip was secured to a test plate or clamp, that allow the attachment of a mass or testing fixture to the specimen, distributing the load equally across the strips' width. This is done by using an approximately 1.5 inch portion of each end of the strips. End of the strips were looped through the test plate and secured to itself with tape.

A three inch portion near the middle of the strip was submerged in distilled water in a beaker for a controlled time period (i.e., 5 minutes unless otherwise noted). Care was taken to ensure only the middle portion of the strip was treated and ends of the strip were not wet. After soaking, strips were removed from the water and gently patted dry with a Kimwipe. Strips were attached, spanning vertically from bench (at the bottom) and a pull/force tester (at the top; HF-500 Digital Push Pull Gauge Force). The samples were then subjected to tensile force (i.e., pulled) until strips broke. Peak force during testing was measured (in Newtons) and recorded. The highest and lowest recorded values were discarded and the average measurement of the 3 remaining values was reported.

Results are summarized in FIG. 1, showing increased wet strength for various treated samples relative to the control sample. Applicant has unexpectedly discovered that cross-linkers show a wet strength increase ranging from approximately 0 to 2500 grams of peak force relative to the control sample while maintaining desirable writability and recyclability. In particular, samples 2, 3, 5, 6, 7, 10, 11, 12, 13, and 15 unexpectedly show a markedly increase wet strength relative to the control. The control sample was not able to withstand any appreciable tensile force before breakage.

Example 3

Effect of Various Cross-Linkers

Various cross-linkers were applied and tested on 24 pound recycled paper ("RP") and 24 pound wet strength paper ("WP") for each sample type tested, including control samples according to the procedure described in Example 2. Cross-linkers were added as indicated in Table 3 above. The results show the effect of each cross-linker on the wet strength of the treated paper.

Figure 2:
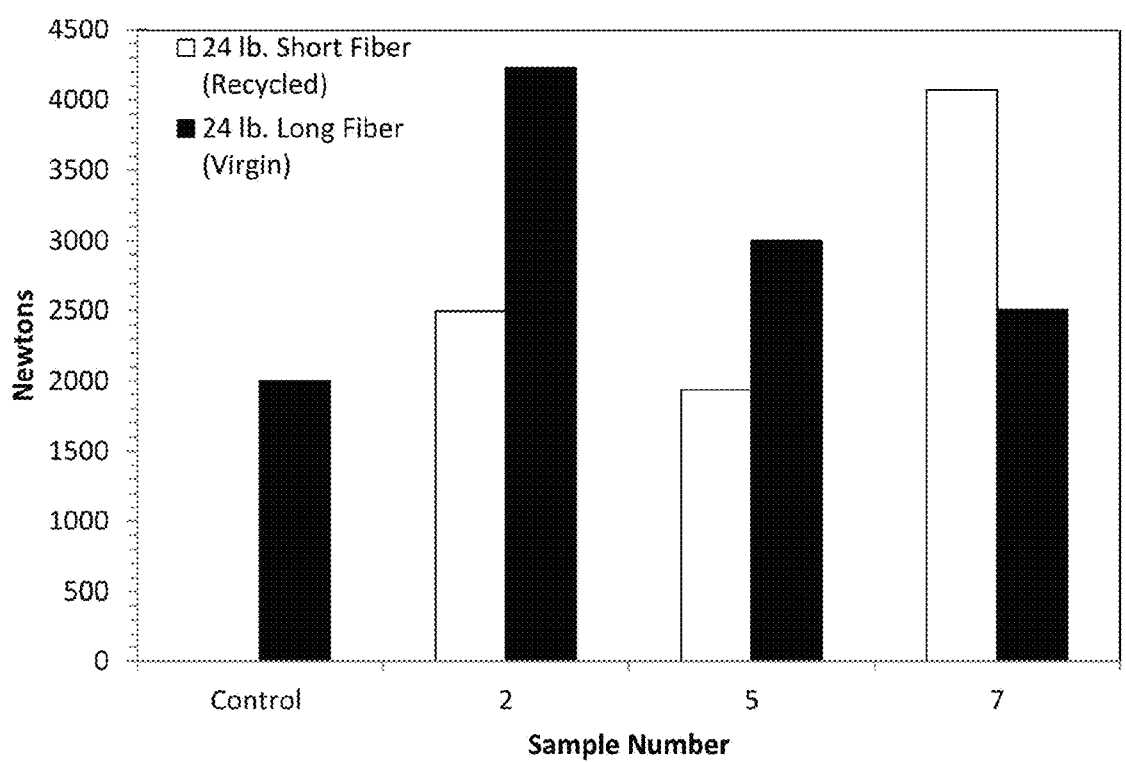
FIG. 2 depicts wet strength measurements of long and short fiber papers when treated with various cross-linkers in a coating mixture.

Results are summarized in FIG. 2, showing increased wet strength for each treated WS sample relative to the control and RP samples showing markedly increase wet strength relative to RP control. Applicant has unexpectedly discovered that wet strength virgin paper has an increased wet strength when cross-linked and coated with a durable weatherproof coating layer while retaining writability and recyclability. The wet strength of the treated short fiber samples is comparable or greater than wet strength of treated long fiber samples 5 and 7.

Example 4

Viscosity of Weatherproofing Cross-Linking Compositions

Compositions used to contact the cellulosic substrate have different viscosities based on composition and environmental conditions (e.g., water drying). It is important to note that viscosity measurements over time (i.e., approximately 8 hours) of the composition must be maintained so the composition is pourable for manufacturing applications. To test viscosity, a styrene/acrylate copolymer was mixed with different cross-linking agents (control sample contained no cross-linking agent) as indicated in Table 3. Cross-linker was added at a concentration of 3% by weight. The compositions were mixed well and kept sealed to eliminate evaporation during intervals between testing. The testing procedures were performed according to the instrument manual (Brookfield Dial Viscometer—Manual No. M/85-150-P700). Test samples remained exposed to air during test measurements.

Figure 3:
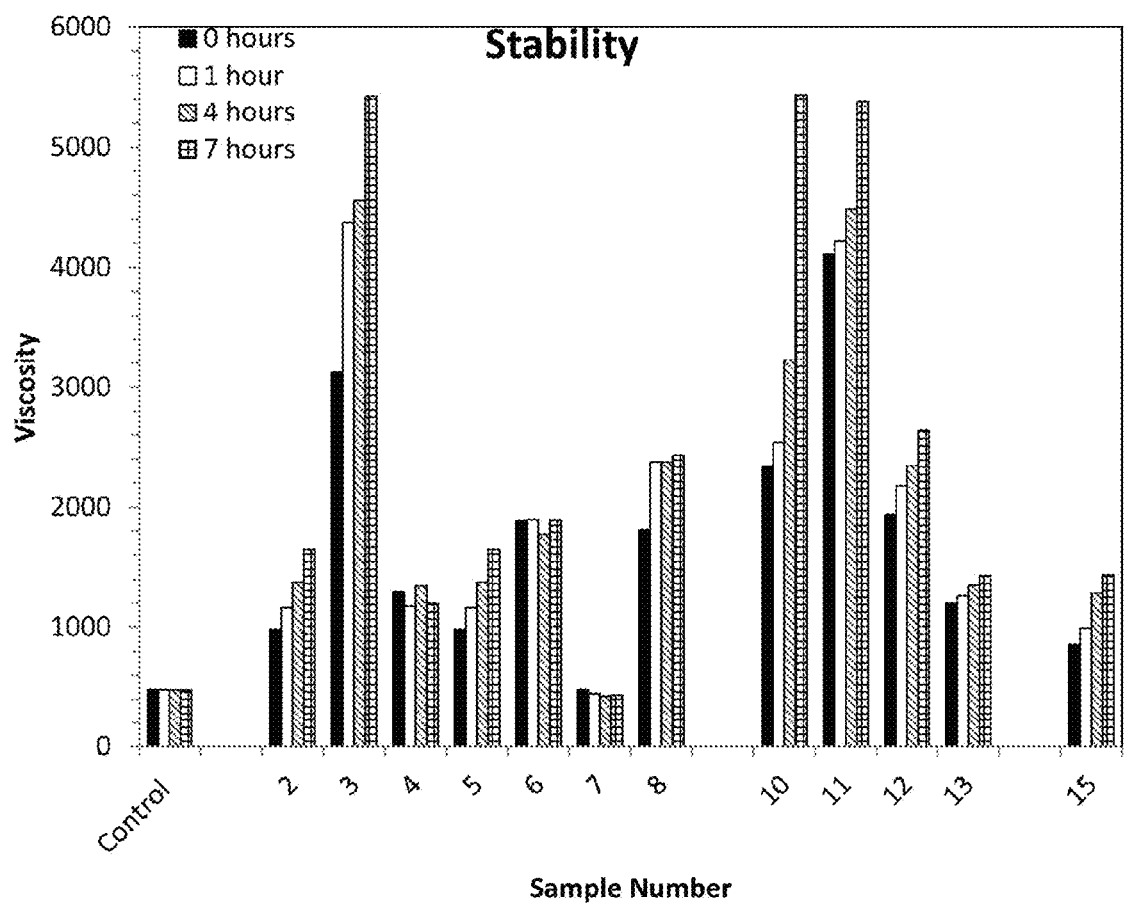
FIG. 3 illustrates the viscosity stability of different compositions comprising cross-linkers and polymers for forming a coating layer.
Figure 4:
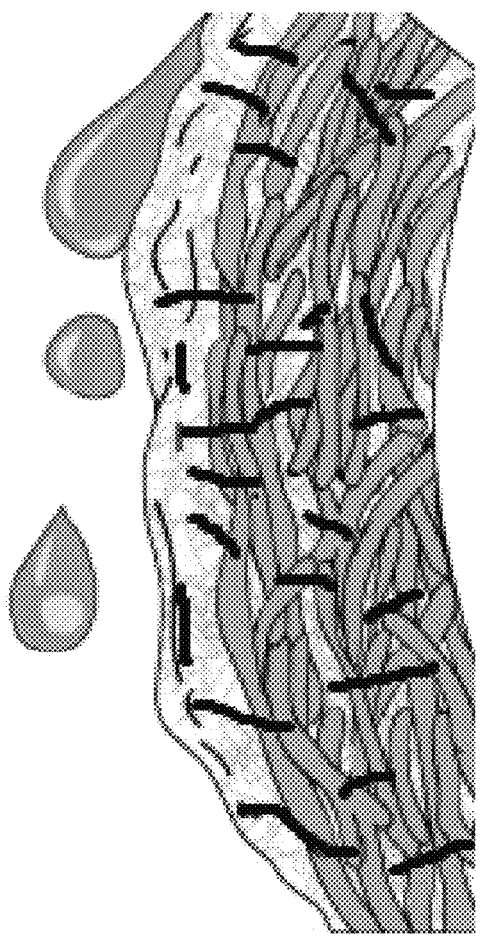
FIG. 4 is an example illustration showing a substrate comprising cellulose fibers, cross-links and an impregnated coating layer

Test results are depicted in FIG. 3. As evidenced by the test results, the viscosity for different cross-linker mixtures is variable. It was unexpectedly discovered that samples with a cross-linking agent generally maintained good viscosity while still imparting desirable characteristics when used to treat paper (i.e., increase wet strength, writability, and recyclability). Samples 2, 4, 5, 6, 13, and 15 all maintained a viscosity value below 2000 for the duration of testing. Samples 3, 8, 10, 11 and 12 showed an increase in viscosity for later time points with a viscosity measurement(s) greater than 2000 during testing. The sample 7 actually showed a viscosity that was lower than the control sample and a viscosity decrease at later testing time points. Samples 4 and 6 had viscosity measurements that remained relatively unchanged during testing with samples 2, 5, 8, 12, 13, and 15 showing only a slight increase in viscosity over time.

Example 5

Recyclability Testing

In one important aspect, a cross-linked cellulosic substrate can be recycled using conventional equipment and techniques. To simulate conventional recycling conditions, treated samples were cut into 1 inch squares and apportioned into 20 gram samples. The squares were added to 500 mL of distilled water and mixed using a high speed mechanical bladed mixer (1000 watt Nutribullet) at approximately 25,000 rpm for 10 minutes. Of the resultant mixture, 25 mL was added to an additional 175 mL of distilled water in a glass container (e.g., beaker or flask) and particulate was observed. Visible particulate is noted based on visual inspection. It was unexpectedly discovered that samples with improved wet strength from cross-linking maintained recyclability.

Example 6

Writing Testing

To test writability of sheets, samples were prepared according to Example 1 and exposed to water. Test sheets were prepared using four cross-linkers as indicated in Table 3 above. Each prepared sheet was tested by depositing 10 mL of water onto the surface of the paper, where it remained for 5 minutes. The interaction was observed, noting any wicking or beading. The test sample was then tipped to allow excess water to pour off and the test area was gently patted dry.

The treated area was then tested for writability using a standard ball point pen (e.g., BIC Stic Ballpoint Pen) with oil based ink. Writability is then scored on a scale of 0-10, where 0 denotes unacceptable writability and 10 denotes no substantial wicking, smearing, or paper ripping during writing. It is important to note that wet strength and writability do not always correlate.

TABLE 4

Samples prepared and tested for writability

| Sample | Writability Score | Observation |
| --- | --- | --- |
| Control | 3 | 50% wicking |
| 2 | 5 | 25% wicking |
| 5 | 9 | little to no wicking |
| 7 | 0 | 100% wicking; ripping during writing |

Example 7

Iodine Testing

Coating quality was assessed using iodine testing. The test was performed by preparing a distilled water solution with 5% iodine. Three drops of the prepared solution were deposited onto samples of Example 6 prepared using cross-linkers noted in Table 3 above. Solution remained on each sample for 30 seconds and samples were gently patted dry and observed. Dark/blue spots indicated areas of the sample where the iodine solution was able to penetrate (i.e., where sample coating was not present). Overall, sample 5 showed the best resistance to water exposure during the testing procedure.

The invention claimed is:
1. A recyclable sheet comprising:
a substrate consisting of a 24 pound short fiber recycled paper;
a coating layer formed by directly contacting and impregnantly covering at least one of the two sides of the substrate with a mixture comprising a styrene acrylic polymer and 3 wt % of a methylene diphenyl diisocyanate and polypropylene ether glycol based prepolymer as a cross-linking agent and having a viscosity less than 1900 cP after 7 hours of mixing; and cross-links between:
   i) a plurality of cellulose fibers;
   ii) a plurality of cellulose fibers and the styrene acrylic polymer; and
   iii) styrene acrylic polymer molecules,
wherein the degree of cross-linking is controlled such that the recyclable sheet having the cross-links is recyclable and has a wet strength of at least 2300 newtons and maintains a writability score of 9 on a scale of 0-10 after getting wet without ink feathering or paper tearing, wherein 0 denotes unacceptable writability and 10 denotes no wicking, smearing, or paper ripping during writing based on a test using oil based ink from a ballpoint pen.

2. The recyclable sheet of claim 1, wherein the coating layer further comprises a second polymer.

3. The recyclable sheet of claim 2, wherein the second polymer is a copolymer.

4. The recyclable sheet of claim 2, wherein the second polymer is a polyacrylic polymer.

5. The recyclable sheet of claim 1, wherein the density of the coating layer on the sheet ranges from about 0.5 grams per square meter of the sheet to about 10.0 grams per square meter of the sheet.

6. The recyclable sheet of claim 1, wherein the coating layer has a moisture content less than 10% by weight based on the total weight of the coating layer.

7. The recyclable sheet of claim 1, wherein the coating layer has a total polymer content of less than 85% by weight, based on the total weight of the coating layer.

8. The recyclable sheet of claim 1, wherein the coating layer further comprises barium sulfate.

9. The recyclable sheet of claim 1, wherein the coating layer further comprises a wax comprising a paraffin wax, a polypropylene-wax mixture, a polyethylene-wax mixture, carnauba wax, microcrystalline wax, montan wax, a Fisher-Tropsch wax, beeswax or mixtures thereof.

10. The recyclable sheet of claim 1, wherein the recyclable sheet having the cross-links has the wet strength of at least 2900 newtons.

11. A method for forming a recyclable sheet, the method comprising:
   i. providing a substrate consisting of a 24 pound short fiber recycled paper; and
   ii. contacting the substrate with a composition comprising a mixture of styrene acrylic polymer and 3 wt % of a methylene diphenyl diisocyanate and polypropylene ether glycol based prepolymer as a cross-linking agent and having a viscosity less than 1900 cP after 7 hours of mixing thereby forming:
      a) a coating layer; and
      b) cross-links between:
         i) a plurality of cellulose fibers;
         ii) a plurality of cellulose fibers and the styrene acrylic polymer; and
         iii) styrene acrylic polymer molecules,
      wherein the degree of cross-linking is controlled such that the recyclable sheet having the cross-links is recyclable and has a wet strength of at least 2300 newtons and maintains a writability score of 9 on a scale of 0-10 after getting wet without ink feathering or paper tearing, wherein 0 denotes unacceptable writability and 10 denotes no wicking, smearing, or paper ripping during writing based on a test using oil based ink from a ballpoint pen.

12. The method of claim 11, wherein the recyclable sheet having the cross-links has a wet strength of at least 2900 newtons.

13. The method of claim 11, wherein the mixture further comprises a second polymer.

14. The method of claim 13, wherein the second polymer is a copolymer.

15. The method of claim 13, wherein the second polymer is a polyacrylic polymer.

* * * * *